US012685246B2

(12) United States Patent
Fior et al.

(10) Patent No.: US 12,685,246 B2
(45) Date of Patent: Jul. 21, 2026

(54) AGRICULTURAL IMPLEMENTS HAVING SENSORS TO DETECT PLUGGING OF ROW UNITS, AND RELATED CONTROL SYSTEMS AND METHODS

(71) Applicant: AGCO DO BRASIL SOLUÇÕES AGRÍCOLAS LTDA, Ribeireo Preto (BR)

(72) Inventors: Vinicius Felipe Fior, Canoas (BR); Venicius Damo Cunha, Ibirubá (BR)

(73) Assignee: AGCO do Brasil Soluções Agrícolas Ltda., Jundiaí (BR)

( * ) Notice: Subject to any disclaimer, the term of this patent is extended or adjusted under 35 U.S.C. 154(b) by 539 days.

(21) Appl. No.: 18/245,754

(22) PCT Filed: Oct. 15, 2021

(86) PCT No.: PCT/IB2021/059487
§ 371 (c)(1),
(2) Date: Mar. 17, 2023

(87) PCT Pub. No.: WO2022/096970
PCT Pub. Date: May 12, 2022

(65) Prior Publication Data
US 2023/0354735 A1     Nov. 9, 2023

(30) Foreign Application Priority Data

Nov. 4, 2020     (GB) ..................................... 2017447

(51) Int. Cl.
*A01B 79/00*          (2006.01)
*A01B 63/00*          (2006.01)
*G06T 7/00*           (2017.01)

(52) U.S. Cl.
CPC .......... *A01B 79/005* (2013.01); *A01B 63/008* (2013.01); *G06T 7/0002* (2013.01); *G06T 2207/30188* (2013.01)

(58) Field of Classification Search
CPC ... A01B 63/008; A01B 79/005; G06T 7/0002; G06T 2207/30188
See application file for complete search history.

(56) References Cited

U.S. PATENT DOCUMENTS

| | | | |
|---|---|---|---|
| 9,026,321 B2 | 5/2015 | Henry et al. | |
| 10,327,374 B2 | 6/2019 | Achen et al. | |
| 11,589,494 B2* | 2/2023 | Smith | .................... A01B 19/10 |
| 12,102,030 B2* | 10/2024 | Kowalchuk | .......... A01B 63/008 |
| 2015/0296701 A1 | 10/2015 | Anderson | |
| 2017/0112043 A1* | 4/2017 | Nair | ........................ A01B 33/16 |
| 2018/0210450 A1* | 7/2018 | Ferrari | .................... G06T 7/001 |

(Continued)

OTHER PUBLICATIONS

UK Intellectual Property Office, Search report for related UK Application No. GB2017447.0, dated Apr. 29, 2021, 3 pages.

(Continued)

*Primary Examiner* — Matthew R Buck

(57) ABSTRACT

An agricultural implement includes a frame having an elongate toolbar carrying a plurality of row units. A sensor is configured to detect residue accumulation between adjacent row units. An actuator is configured to raise or lower a row unit based at least in part on the residue accumulation detected by the sensor. Control systems and related methods are also disclosed.

20 Claims, 5 Drawing Sheets

(56)                    References Cited

U.S. PATENT DOCUMENTS

| 2018/0352718 A1* | 12/2018 | Kovach | ............... | A01B 49/027 |
|---|---|---|---|---|
| 2020/0100419 A1 | 4/2020 | Stanhope | | |
| 2020/0107488 A1* | 4/2020 | Schoeny | ............... | A01C 5/068 |
| 2020/0107494 A1 | 4/2020 | Schoeny et al. | | |
| 2020/0128719 A1* | 4/2020 | Harmon | ............... | A01B 63/008 |
| 2020/0404829 A1* | 12/2020 | Knobloch | ............. | A01B 19/10 |
| 2021/0105928 A1* | 4/2021 | Henry | ................. | A01B 63/245 |
| 2021/0127546 A1* | 5/2021 | Smith | ................... | A01B 47/00 |

OTHER PUBLICATIONS

European Patent Office, International Search Report related to International Patent Application No. PCT/IB2021/059487, mail date Jan. 4, 2022, 13 pages.

* cited by examiner

300

| | |
|---|---|
| Receive indication of plugging condition of row unit from sensor | 302 |
| Cause actuator to raise or lower row unit to clear plugging condition | 304 |

400

402

404

406

408

AGRICULTURAL IMPLEMENTS HAVING SENSORS TO DETECT PLUGGING OF ROW UNITS, AND RELATED CONTROL SYSTEMS AND METHODS

CROSS-REFERENCE TO RELATED APPLICATIONS

This application is a national phase entry under 35 U.S.C. § 371 of International Patent Application PCT/IB2021/059487, filed Oct. 15, 2021 designating the United States of America and published in English as International Patent Publication WO2022/096970 A1 on May 12, 2022, which claims the benefit of the filing date of U. K. Patent Application GB2017447.0, "Agricultural Implements Having Sensors to Detect Plugging of Row Units, and Related Control Systems and Methods," filed Nov. 4, 2020, the entire disclosure of which is incorporated herein by reference.

FIELD

Embodiments of the present disclosure relate generally to machines and methods for working agricultural fields. In particular, embodiments relate to planters and other implements having row units and to methods of controlling such implements.

BACKGROUND

Crop yields are affected by a variety of factors, such as seed placement, soil quality, weather, irrigation, and nutrient applications. Seeds are typically planted in trenches formed by discs or other mechanisms of a planter row unit. Depth of seed placement is important because seeds planted at different depths emerge at different times, resulting in uneven crop growth. Trench depth can be affected by soil type, moisture level, row unit speed, and operation of the opening discs.

During planting and other operations, row units (e.g., planters, tillage equipment, etc., arranged along a toolbar to form rows in the field) may become blocked or plugged with residue (crop material from prior seasons). When plugging occurs, the operator may stop the operation to clear the blockage. The blockage may be cleared by manually removing residue, or by raising and lowering the frame, toolbars, or affected row units to allow residue to fall to the ground.

BRIEF SUMMARY

In some embodiments, an agricultural implement includes a frame having an elongate toolbar carrying a plurality of row units. A sensor is configured to detect residue accumulation between adjacent row units. An actuator is configured to raise or lower row units (either individually, as a group, or by raising or lowering the toolbar or frame) based at least in part on the residue accumulation detected by the sensor.

Other embodiments include a control system for an implement including a frame having an elongate toolbar carrying a plurality of row units. The control system includes a sensor configured to detect residue accumulation between adjacent rows unit of the plurality, an actuator configured to raise or lower a row unit, and a controller configured to receive a signal from the sensor indicating residue accumulation and cause the actuator to raise or lower the row unit.

Certain embodiments include a computer-implemented method for operating an implement that includes a frame having an elongate toolbar carrying a plurality of row units. The method includes receiving an indication of residue accumulation between adjacent row units from a sensor, and causing an actuator to raise or lower a row unit responsive to the residue accumulation.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
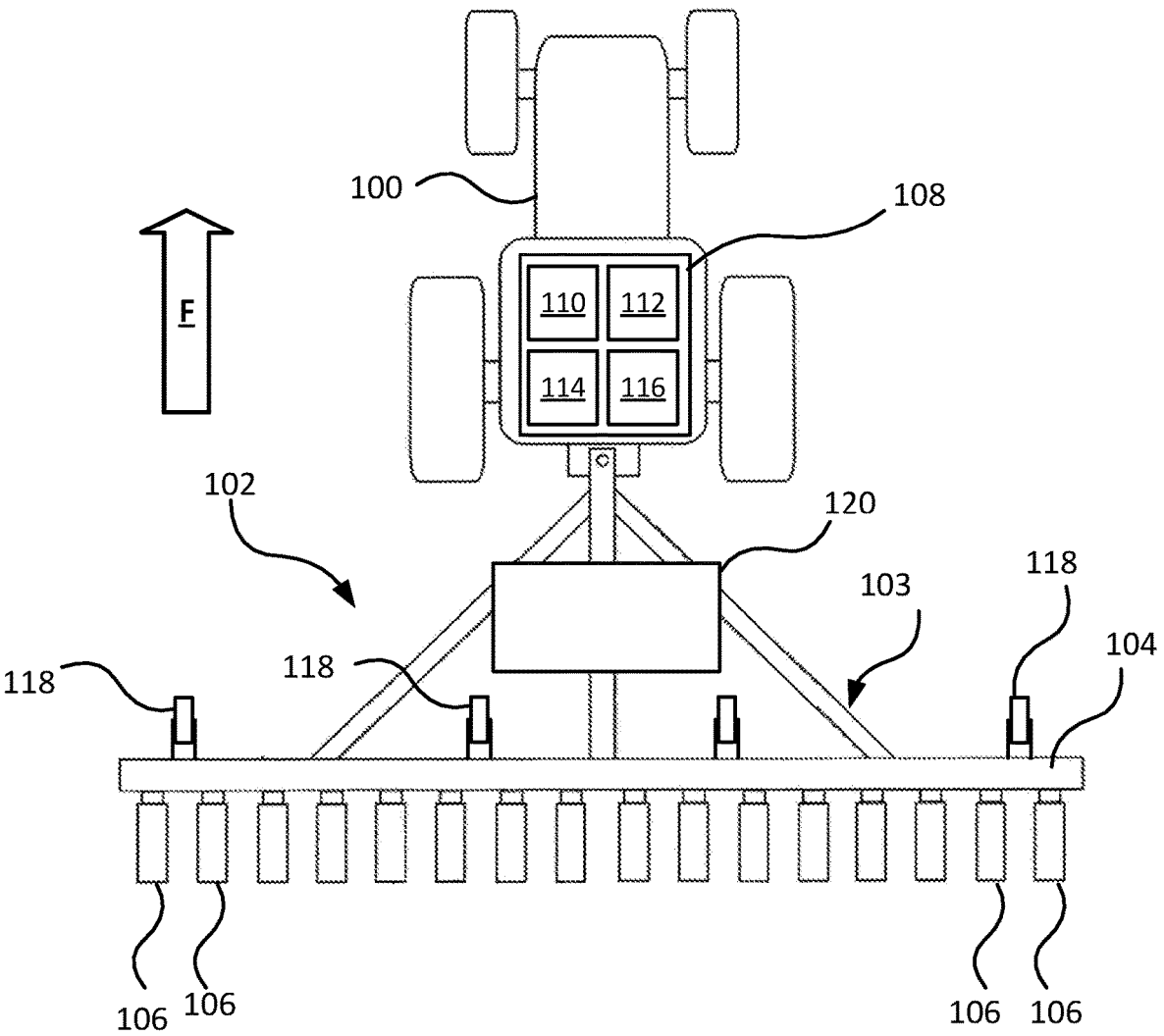
FIG. 1 is a simplified top view of a tractor pulling an implement in accordance with one embodiment.

The illustrations presented herein are not actual views of any implement or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates a tractor 100 drawing an agricultural implement 102 in a forward direction F. The implement 102 has a frame 103 including a toolbar 104 supporting row units 106. A computer 108, which may include a central processing unit ("CPU") 110, memory 112, implement controller 114, and graphical user interface ("GUI") (e.g., a touchscreen interface), is typically located in the cab of the tractor 100. A global positioning system ("GPS") receiver 116 may be mounted to the tractor 100 and connected to communicate with the computer 108. The implement controller 114 may be configured to communicate with the row units 106 and/or the GPS receiver 116, such as by wired or wireless communication. In some embodiments, the computer 108 or portions thereof may be part of the implement 102. The implement 102 may be supported in the field by at least one wheel 118 coupled to the frame 103 or the toolbar 104. Typically, the frame 103 or toolbar 104 is attached to at least two wheels 118, such as to four wheels as shown in FIG. 1. The frame 103 and toolbar 104 may have sections that fold for transport on a public roadway (e.g., to make the implement 102 narrower than the working position depicted in FIG. 1). The implement frame 103 may support a central hopper 120 or tank to transport seed, fertilizer, or other material to be applied to the field.

The row units 106 may include any type of ground-engaging device for planting, seeding, fertilizing, tilling, or otherwise working crops or soil in rows. As an example, FIG. 2 is a simplified side view illustrating a row unit 106 having a tillage section 201a and a planter section 201b.

The tillage section 201a and/or the planter section 201b may be pivotally connected to the toolbar 104 by parallel linkages 204 or other mechanisms to enable the tillage section 201a and/or the planter section 201b to move vertically independent of the frame 103, toolbar 104, and other row units 106. In some embodiments, the toolbar 104 may be coupled to the frame 103 at a pivot point, and an actuator 234 (e.g., a hydraulic cylinder) may control the position of the toolbar 104 relative to the frame 103. In other embodiments, the toolbar 104 position may be controlled by a parallel linkage or other mechanism. The row unit 106 may include one or more hoppers 206, a seed meter 208, a seed trench opening assembly 212 (e.g., opening wheels), a trench closing assembly 214 (e.g., closing wheels), gauge wheel(s) 218, a cutting disc or coulter 220, a tillage shank 222, and any other components as known in the art. It should be understood that the row unit 106 shown in FIG. 2 may optionally be a part of a central fill planter, in which case the hoppers 206 may be one or more mini-hoppers fed by the central hopper 120 (FIG. 1) carried by the implement 102.

Figure 2:
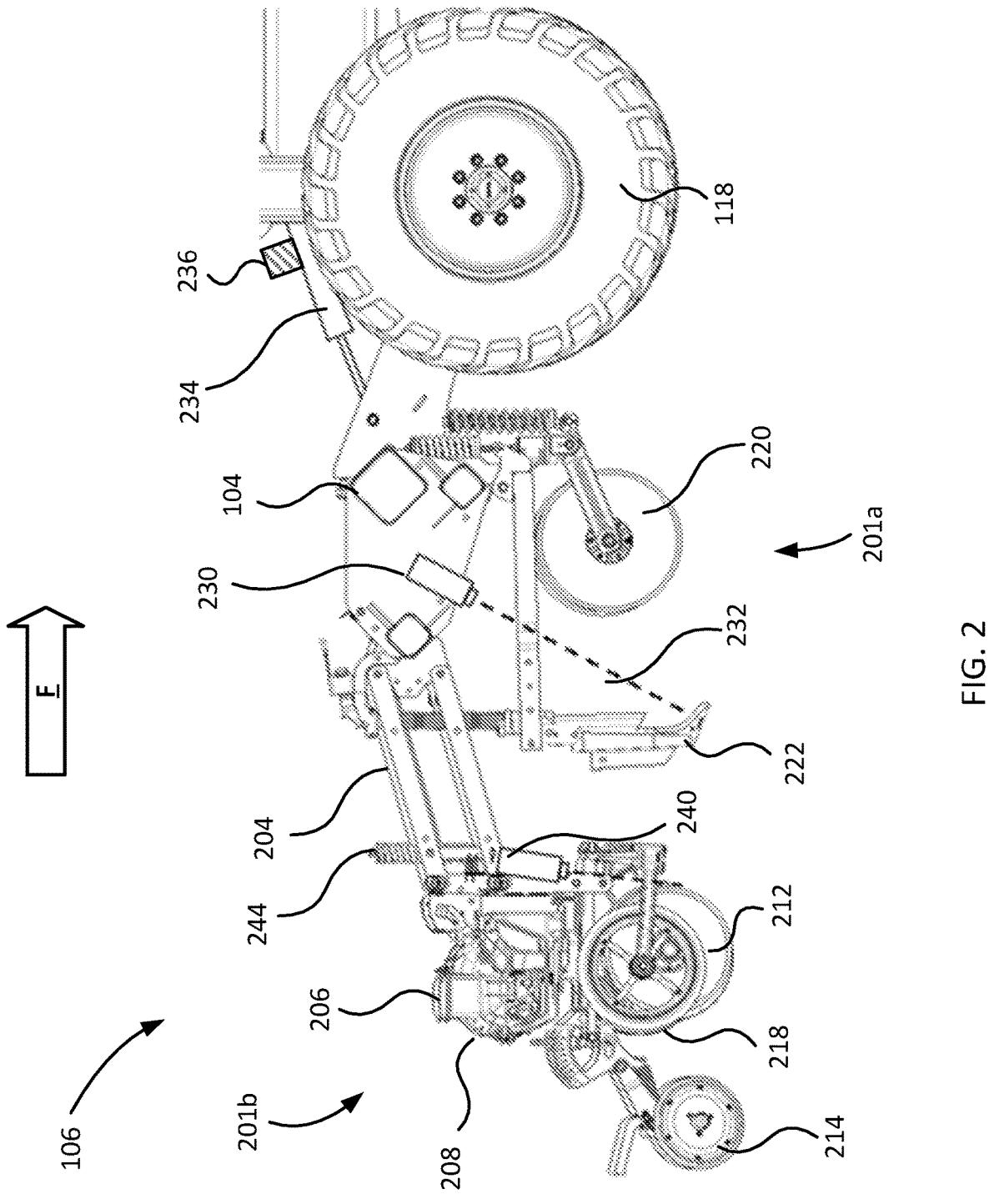
FIG. 2 is a simplified side view of a row unit that may be carried by the implement shown in FIG. 1.
Figure 3:
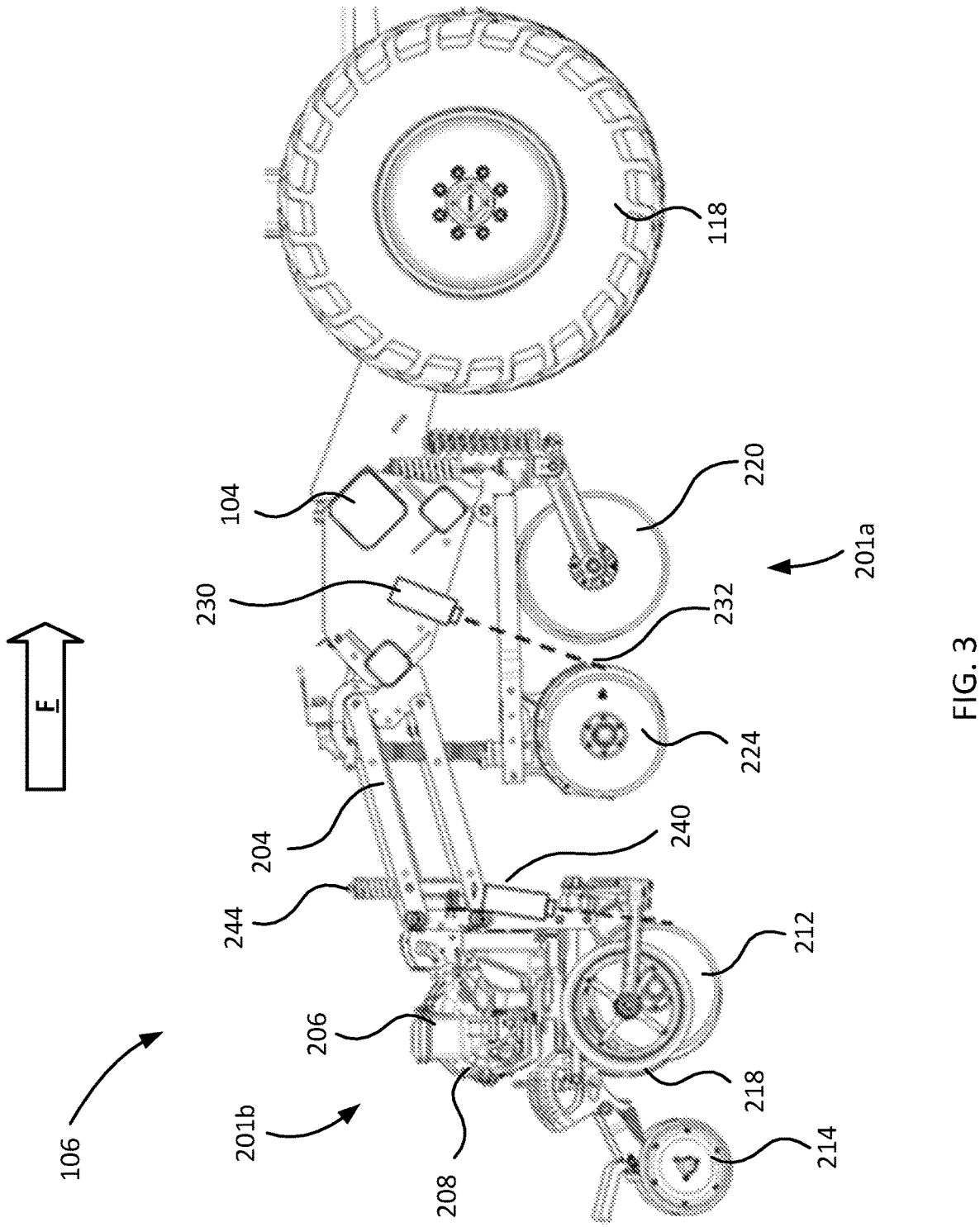
FIG. 3 is a simplified side view of another row unit that may be carried by the implement shown in FIG. 1.

As depicted in FIG. 2, the tillage section 201a may include the cutting blade 220 and the tillage shank 222. The planter section 201b may include the hopper(s) 206, the seed meter 208, the seed trench opening assembly 212, the gauge wheel(s) 218, and the trench closing assembly 214. In some embodiments, the tillage section 201a may be in the form of one or more generally transverse bars (i.e., oriented generally perpendicular to the forward direction F) carrying the opening assembly 212, the tillage shank 222, and/or other tools. FIG. 3 depicts another row unit 106' in which the tillage section 201a includes another cutting disc or coulter 224 rather than a tillage shank 222. Thus, the row units 106, 106' may include any selected combination of ground-engaging tools.

The row unit 106 may carry at least one sensor 230 configured to detect a plugging condition of the row unit 106. For example, the sensor 230 may be an optical sensor (e.g., a camera), an ultrasonic transducer, an RF (radio frequency) sensor, lidar, radar, etc. Such sensors are described in, for example, U.S. Patent Application Publication 2019/0075710, "Seed Trench Depth Detection Systems," published Mar. 14, 2019. In some embodiments, the sensor 230 may be coupled with a transmitter, such as a laser transmitter. The sensor 230 may be configured to detect reflection of an electromagnetic signal 232, which may be used to calculate a distance the signal 232 has traveled. This information may be used to infer the presence of residue in the row unit 106 or between row units 106, and the location or amount of residue. For example, if the distance the signal 232 travels before being reflected is the same as the distance from the sensor 230 to the tillage shank 222, the computer 108 (FIG. 1) may determine that the tillage shank 222 (FIG. 2) or coulter 224 (FIG. 3) is not blocked by residue. However, if the distance the signal 232 travels before being reflected is less than the distance from the sensor 230 to the tillage shank 222 or coulter 224 by a preselected threshold, the computer 108 may determine that the tillage shank 222 or coulter 224 is blocked by residue. As another example, a change in the distance the signal 232 travels greater than a preselected threshold may be used to infer a change in the amount of residue blocking the row unit. In other embodiments, the sensor 230 may be a camera, and the computer 108 may detect residue by image-processing techniques, such as by identifying shapes of residue material or by detecting movement in the field of view.

Figure 6:
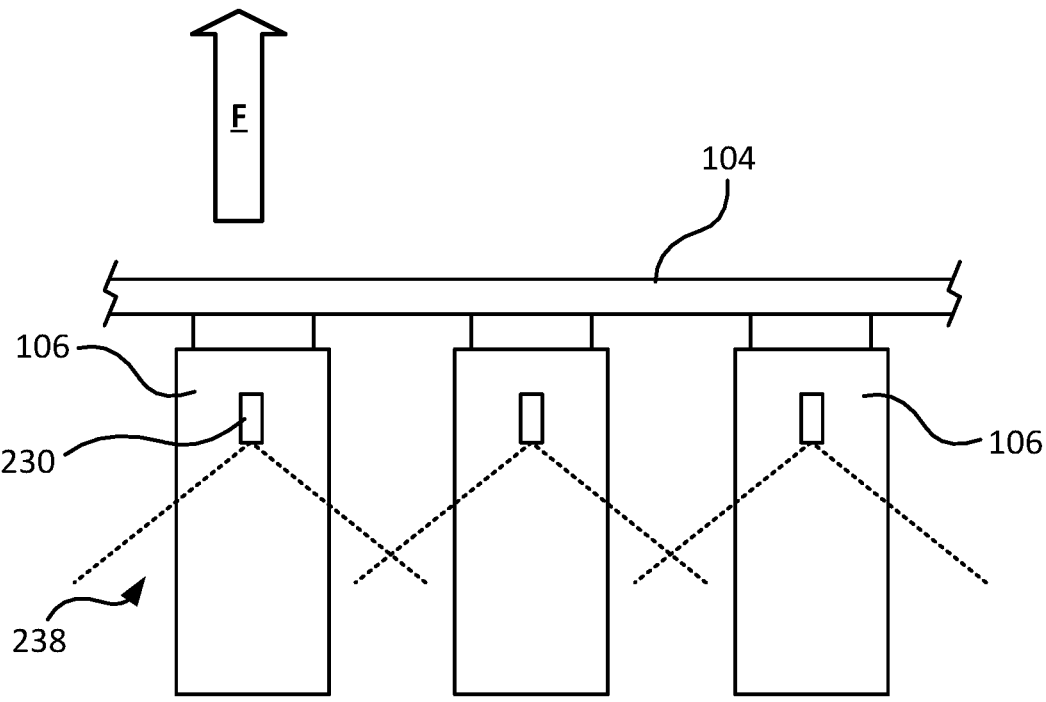
FIG. 6 is a simplified top view of a portion of the implement in shown in FIG. 1.

FIG. 6 illustrates a field of view 238 of the sensors 230. The field of view 238 may be wide enough so that each sensor 230 can detect residue accumulation between adjacent row units 106 on or over the surface of the ground. In some embodiments, the field of view 238 may encompass neighboring row units 106, and thus, not every row unit 106 need have its own sensor 230. The field of view 238 is not limited to (and need not even include) the furrow formed by the row unit 106, but by detecting residue accumulation in front of the tillage shank 222, and/or other tools, the row unit 106 can form more consistent furrows, and thus, crop yield may be increased.

Once a blockage has been detected, the computer 108 and/or the implement controller 114 (FIG. 1) may take appropriate action to correct the blockage. For example, the computer 108 may alert an operator that there is blockage and/or the controller 114 may initiate a control sequence to clear the blockage. In some embodiments, the controller 114 may control an actuator 234 to temporarily raise the frame 103, toolbar 104, row unit 106, or a portion thereof (e.g., the tillage section 201a, the planter section 201b, or an individual component, such as the tillage shank 222) to cause the residue to separate from the row unit 106. In some embodiments, the computer 108 may control the tractor 100 to stop moving in a forward direction F or to move backward (in a direction opposite the direction F) while the blockage is cleared. Once the blockage is cleared, the actuator 234 may lower frame 103, toolbar 104, the row unit 106, or portion thereof, and the tractor 100 may start moving forward again. The actuator 234 may be pneumatic, hydraulic, electric, or any other type. The actuator 234 may be controlled by a control component 236 (illustrated simply as a hatched box connected to the actuator 234 in FIG. 2), such as a control valve, an air valve, an electronic control component, a magnetic control component, etc. The controller 114 may send a signal to the control component 236 to cause changes in the position of the actuator 234.

In some embodiments, the sensor 230 may be configured to detect plugging of more than one row unit 106. For example, if the sensor 230 is a camera, it may have a field of view wide enough to detect plugging of the row unit 106 carrying the camera, as well as row units 106 on either side. As shown in FIG. 2, the sensor 230 may be carried on the row unit 106 itself. In other embodiments, the sensor 230 may be carried by the toolbar 104 or another portion of the implement 102 (FIG. 1), and may be directed at multiple row units 106.

In certain embodiments, an additional sensor 240 may be configured to detect plugging of another part of the row unit 106. For example, the additional sensor 240 may be a part of the planter section 201b, and may be directed to detect residue blocking the gauge wheel(s) 218. The additional sensor 240 may be a camera, transceiver, etc., as described above with respect to the sensor 230. The controller 114 may control another actuator 244 to raise and lower the planter section 201b of the row unit 106, as described relative to the actuator 234.

Figure 4:
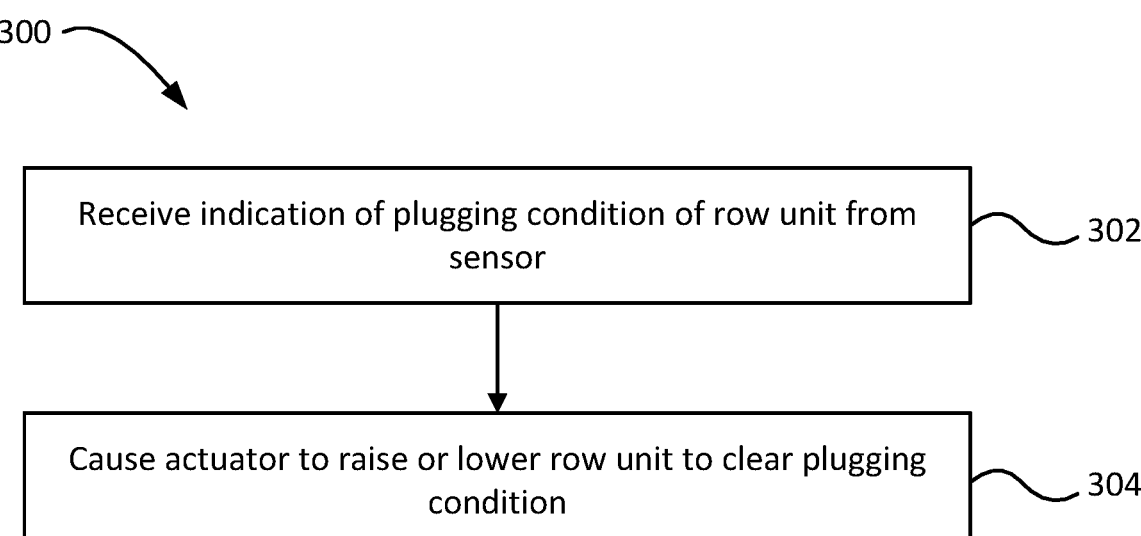
FIG. 4 is a simplified flow chart illustrating a method of operating an implement.

FIG. 4 is a simplified flow chart illustrating a computer-implemented method 300 of using the implement 102 to work an agricultural field. In block 302, an indication is received of a plugging condition of at least one row unit from a sensor. For example, a photograph or an electromagnetic signal may be received from the sensor. In block 604, an actuator raises or lowers the at least one row unit to clear the plugging condition. For example, a control signal may be sent to a control component associated with the actuator. In some embodiments, forward motion of the implement may be terminated while the plugging condition is cleared. Furthermore, an operator may be alerted of the plugging condition and/or the clearing process.

The methods and devices shown and described may be used for any type of planter or tillage implement, including seeders, drills, vertical tillage, etc., including implements having more than one type of tool. The methods may be particularly beneficial for relatively large implements, which are difficult for an operator to monitor visually from the cab of the tractor. Furthermore, plugging conditions may be relatively more common in no-till fields than other fields, so the methods and devices may be particularly beneficial in such fields.

Figure 5:
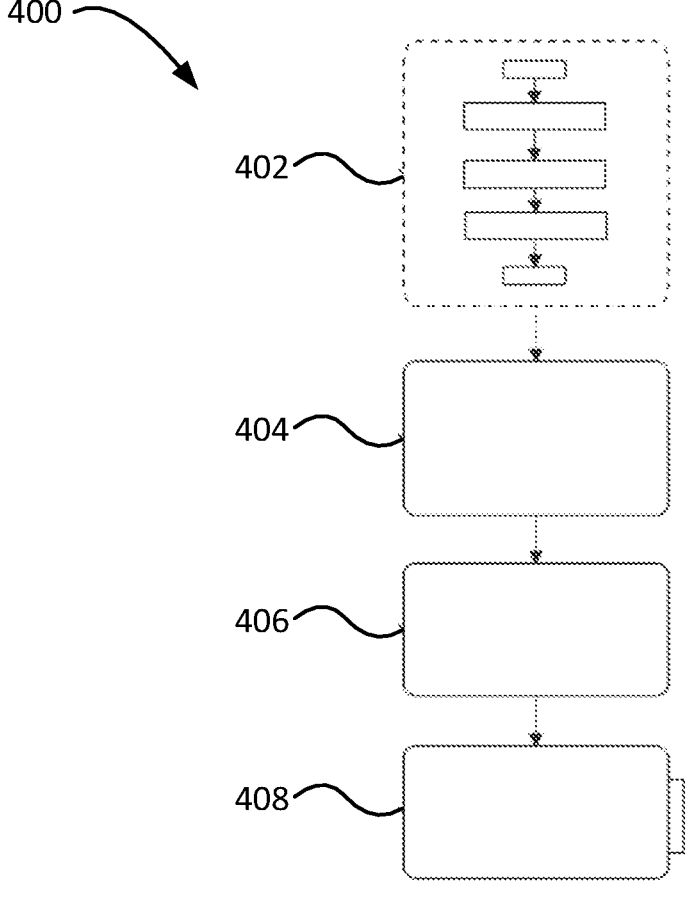
FIG. 5 illustrates an example computer-readable storage medium comprising processor-executable instructions configured to embody one or more of the methods of operating an implement, such as the method illustrated in FIG. 4.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 5, wherein an implementation 400 includes a computer-readable storage medium 402 (e.g., a flash drive, CD-R, DVD-R, application-specific integrated circuit (ASIC), field-programmable gate array (FPGA), a platter of a hard disk drive, etc.), on which is computer-readable data 404. This computer-readable data 404 in turn includes a set of processor-executable instructions 406 configured to operate according to one or more of the principles set forth herein. In some embodiments, the processor-executable instructions 406 may be configured to cause a computer associated with the tractor 100 (FIG. 1) to perform operations 408 when executed via a processing unit, such as at least some of the example method 300 depicted in FIG. 4. In other embodiments, the processor-executable instructions 406 may be configured to control a system, such as at least some of the example tractor 100 and implement 102 depicted in FIGS. 1 and 2. Many such computer-readable media may be devised by those of ordinary skill in the art that are configured to operate in accordance with one or more of the techniques presented herein.

Additional non limiting example embodiments of the disclosure are described below.

Embodiment 1: An agricultural implement, comprising a frame having an elongate toolbar carrying a plurality of row units, a sensor configured to detect residue accumulation between adjacent row units of the plurality, and an actuator configured to raise or lower at least one row unit based at least in part on the residue accumulation detected by the sensor.

Embodiment 2: The implement of Embodiment 1, wherein the sensor comprises a camera.

Embodiment 3: The implement of Embodiment 1, wherein the sensor is configured to detect a distance to residue.

Embodiment 4: The implement of Embodiment 3, wherein the sensor is configured to detect a reflected electromagnetic signal.

Embodiment 5: The implement of Embodiment 4, wherein the sensor is configured to detect a signal selected from the group consisting of laser, radar, and ultrasonic.

Embodiment 6: The implement of any one of Embodiment 1 through Embodiment 5, further comprising a controller configured to receive information from the sensor and control the actuator based on the information.

Embodiment 7: The implement of Embodiment 6, further comprising a control component configured to drive the actuator, wherein the controller is configured to send a control signal to the control component.

Embodiment 8: The implement of Embodiment 7, wherein the control component comprises a component selected from the group consisting of a control valve, an air valve, an electronic control component, a magnetic control component, and an electromagnetic control component.

Embodiment 9: The implement of any one of Embodiment 1 through Embodiment 8, further comprising another sensor configured to detect additional residue accumulation between adjacent row units of the plurality.

Embodiment 10: A control system for an implement comprising a frame having an elongate toolbar carrying a plurality of row units. The control system comprises a sensor configured to detect residue accumulation between adjacent row units of the plurality, an actuator configured to raise or lower at least one row unit, and a controller configured to receive a signal from the sensor indicating residue accumulation and cause the actuator to raise or lower the at least one row unit based at least in part on the residue accumulation between the adjacent row units.

Embodiment 11: The control system of Embodiment 10, wherein the sensor comprises a camera.

Embodiment 12: The control system of Embodiment 10 or Embodiment 11, further comprising a control component configured to drive the actuator responsive to a control signal from the controller.

Embodiment 13: A computer-implemented method for operating an implement that comprises a frame having an elongate toolbar carrying a plurality of row units and a sensor configured to detect residue accumulation between adjacent row units. The method comprises receiving an indication of residue accumulation between the adjacent row units from the sensor, and causing an actuator to raise or lower at least one row unit responsive to the residue accumulation.

Embodiment 14: The method of Embodiment 13, further comprising alerting an operator of the residue accumulation.

Embodiment 15: The method of Embodiment 13 or Embodiment 14, wherein causing the actuator to raise or lower the at least one row unit comprises terminating forward motion of the implement while the actuator raises or lowers the at least one row unit.

Embodiment 16: The method of any one of Embodiment 13 through Embodiment 15, wherein causing the actuator to raise or lower the at least one row unit comprises sending a control signal to a control component associated with the actuator.

Embodiment 17: The method of any one of Embodiment 13 through Embodiment 16, wherein receiving an indication of residue accumulation between the adjacent one row units from the sensor comprises receiving a photograph from the sensor.

Embodiment 18: The method of any one of Embodiment 13 through Embodiment 16, further comprising detecting an electromagnetic signal with the sensor to identify the residue accumulation.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope as hereinafter claimed, including legal equivalents thereof. In addition, features from one embodiment may be combined with features of another embodiment while still being encompassed within the scope contemplated by the inventors. Further, embodiments of the disclosure have utility with different and various agricultural machine types and configurations.

What is claimed is:

1. A planter implement, comprising:
   a frame having an elongate toolbar carrying a plurality of planter row units, each planter row unit coupled to the toolbar by a parallel linkage;
   a sensor configured to detect residue accumulation between adjacent planter row units of the plurality, wherein the sensor has a field of view encompassing at least two adjacent planter row units of the plurality; and
   an actuator configured to raise or lower at least one planter row unit of the plurality based at least in part on the residue accumulation detected by the sensor.

2. The implement of claim 1, wherein the sensor comprises a camera.

3. The implement of claim 1, wherein the sensor is configured to detect a distance to residue.

4. The implement of claim 3, wherein the sensor is configured to detect a reflected electromagnetic signal.

5. The implement of claim 4, wherein the sensor is configured to detect a signal selected from the group consisting of laser, radar, and ultrasonic.

6. The implement of claim 1, further comprising a controller configured to receive information from the sensor and control the actuator based on the information.

7. The implement of claim 6, further comprising a control component configured to drive the actuator, wherein the controller is configured to send a control signal to the control component.

8. The implement of claim 7, wherein the control component comprises a component selected from the group consisting of a control valve, an air valve, an electronic control component, a magnetic control component, and an electromagnetic control component.

9. The implement of claim 1, further comprising another sensor configured to detect additional residue accumulation between other adjacent planter row units of the plurality.

10. The implement of claim 1, wherein the actuator is configured to raise or lower the at least one planter row unit of the plurality relative to the toolbar.

11. The implement of claim 1, wherein the actuator is configured to raise or lower the toolbar relative to the frame.

12. A control system for a planter implement comprising a frame having an elongate toolbar carrying a plurality of planter row units, each planter row unit coupled to the toolbar by a parallel linkage; the control system comprising:
   a sensor configured to detect residue accumulation between adjacent planter row units of the plurality, wherein the sensor has a field of view encompassing at least two adjacent planter row units of the plurality;
   an actuator configured to raise or lower
   at least one planter row unit; and
   a controller configured to receive a signal from the sensor indicating residue accumulation and cause the actuator to raise or lower the at least one planter row unit based at least in part on the residue accumulation between the adjacent planter row units.

13. The control system of claim 12, wherein the sensor comprises a camera.

14. The control system of claim 12, further comprising a control component configured to drive the actuator responsive to a control signal from the controller.

15. A computer-implemented method for operating a planter implement that comprises a frame having an elongate toolbar carrying a plurality of planter row units coupled to the toolbar by parallel linkages, and a sensor having a field of view encompassing at least two adjacent planter row units, the method comprising:

receiving an indication of residue accumulation between the adjacent planter row units from the sensor; and causing an actuator to raise or lower at least one planter row unit responsive to the residue accumulation.

16. The method of claim 15, further comprising alerting an operator of the residue accumulation.

17. The method of claim 15, wherein causing the actuator to raise or lower the at least one planter row unit comprises terminating forward motion of the implement while the actuator raises or lowers the at least one planter row unit.

18. The method of claim 15, wherein causing the actuator to raise or lower the at least one planter row unit comprises sending a control signal to a control component associated with the actuator.

19. The method of claim 15, wherein receiving an indication of residue accumulation between the adjacent planter row units from the sensor comprises receiving a photograph from the sensor.

20. The method of claim 15, further comprising detecting an electromagnetic signal with the sensor to identify the residue accumulation.

<div align="center">* * * * *</div>